(12) United States Patent
Asghari

(10) Patent No.: US 9,217,831 B1
(45) Date of Patent: Dec. 22, 2015

(54) OPTICAL SYSTEM HAVING DYNAMIC WAVEGUIDE ALIGNMENT

(75) Inventor: Mehdi Asghari, Pasadena, CA (US)

(73) Assignee: Kotura, Inc., Monterey Park, CA (US)

( * ) Notice: Subject to any disclaimer, the term of this patent is extended or adjusted under 35 U.S.C. 154(b) by 960 days.

(21) Appl. No.: 12/928,077

(22) Filed: Dec. 1, 2010

Related U.S. Application Data

(60) Provisional application No. 61/284,240, filed on Dec. 15, 2009.

(51) Int. Cl.
  *G02B 6/26* (2006.01)
  *G02B 6/35* (2006.01)

(52) U.S. Cl.
  CPC ............ *G02B 6/3564* (2013.01); *G02B 6/3502* (2013.01)

(58) Field of Classification Search
  CPC .......................................... G02B 6/26–6/3598
  USPC .............................................. 385/40, 52, 140
  See application file for complete search history.

(56) References Cited

U.S. PATENT DOCUMENTS

| | | | | |
|---|---|---|---|---|
| 5,260,567 | A * | 11/1993 | Kuroda et al. | 250/227.19 |
| 5,787,214 | A | 7/1998 | Harpin et al. | |
| 5,870,417 | A * | 2/1999 | Verdiell et al. | 372/32 |
| 6,154,471 | A * | 11/2000 | Jin et al. | 372/20 |
| 6,392,233 | B1 * | 5/2002 | Channin et al. | 250/338.1 |
| 6,577,785 | B1 * | 6/2003 | Spahn et al. | 385/22 |
| 7,054,519 | B1 * | 5/2006 | Novotny | 385/16 |
| 7,444,042 | B1 * | 10/2008 | Niblock et al. | 385/16 |
| 2004/0223717 | A1 * | 11/2004 | Romo | G02B 6/266 385/140 |
| 2005/0207720 | A1 * | 9/2005 | Lee et al. | 385/140 |
| 2008/0304802 | A1 * | 12/2008 | Watanabe et al. | 385/134 |
| 2009/0235396 | A1 * | 9/2009 | Wang et al. | 850/6 |
| 2009/0290834 | A1 * | 11/2009 | Niimura | G02B 6/352 385/18 |

OTHER PUBLICATIONS

Rehder, G. et al., Optical Logic Gates Based on Micro-electro-mechanical Systems, Jul. 9, 2007, SPIE Newsroom, 1-5.
Author believed to be Matthieu Lagouge, MEM's World-Thermal actuation, electronically downloaded from http://matthieu.lagouge.free.fr/ on Jun. 15, 2009 and printed out on Aug. 23, 2013.
Author believed to be Matthieu Lagouge, MEM's World-electrostatic actuators, electronically downloaded from http://matthieu.lagouge.free.fr/ on Jun. 15, 2009 and printed out on Aug. 23, 2013.
Author believed to be Matthieu Lagouge, MEM's World-Piezoelectric materials, electronically downloaded from http://matthieu.lagouge.free.fr/ on Jun. 15, 2009 and printed out on Aug. 23, 2013.

\* cited by examiner

*Primary Examiner* — Eric Wong
(74) *Attorney, Agent, or Firm* — Gavrilovich, Dodd & Lindsey, LLP

(57) ABSTRACT

The system includes a first optical device and a second optical device. The second optical device has a second facet. The first optical device has a waveguide on a base. The waveguide terminates at a waveguide facet. The waveguide facet is positioned so as to exchange light signals with the second facet. The first optical device also has one or more actuators that are each configured to move the waveguide facet relative to the second facet.

20 Claims, 13 Drawing Sheets

OPTICAL SYSTEM HAVING DYNAMIC WAVEGUIDE ALIGNMENT

RELATED APPLICATIONS

This application claims the benefit of U.S. Provisional Patent Application Ser. No. 61/284,240, filed on Dec. 15, 2009, entitled "Optical System Having Dynamic Waveguide Alignment," and incorporated herein in its entirety.

FIELD

The present invention relates to optical devices and particularly, to systems that transfer the light signals between optical devices.

BACKGROUND

The use of optics in communications applications is increasing. Many of these applications make use of systems that include planar optical devices. Planar optical devices often include one or more waveguides that exchange light signals with other optical devices such as optical fibers, diodes, and/or lasers. The waveguides include a facet that must be optically aligned with a second facet on the optical device. Misalignment between these facets is often a large source of optical loss for the system. Further, achieving proper alignment can be time consuming and expensive. As a result, there is a need for improved optical alignment between the facets of waveguides and other optical devices.

SUMMARY

The system includes a first optical device and a second optical device. The second optical device has a second facet. The first optical device has a waveguide on a base. The waveguide terminates at a waveguide facet. The waveguide facet is positioned so as to exchange light signals with the second facet. The first optical device also has one or more actuators that are each configured to move the waveguide facet relative to the second facet. In some instances, the second device is a laser or an optical fiber.

At least one of the one or more actuators can be configured to move the waveguide facet such that a distance between the waveguide facet and a reference plane changes. Additionally or alternately, at least one of the one or more actuators can be configured to move the waveguide facet such that a distance between the waveguide facet and the reference plane remains substantially constant. The reference plane includes a non-actuated line, is perpendicular to the top of the waveguide, and extends through the base. The non-actuated line is parallel to a direction of propagation of light signals in the waveguide at a location that is both at the waveguide facet and on the waveguide side of the waveguide facet at a time when the waveguide facet is in a rest position. The rest position is a position of the waveguide facet when none of the one or more actuators is affecting a location of the waveguide facet.

In one example of a first optical device having a waveguide on a base, the waveguide terminates at a waveguide facet. The waveguide has a top and a bottom with the bottom being between the top of the waveguide and the base. The first optical device also includes a waveguide actuator configured to move the waveguide facet so as to change a distance between the waveguide facet and the reference plane.

BRIEF DESCRIPTION OF THE FIGURES

FIG. 1A is a topview of a portion of the system.

FIG. 1B is a cross-section of the portion of the system shown in FIG. 1A taken along the line labeled B.

FIG. 1C is a cross-section of the portion of the system shown in FIG. 1B.

FIG. 3A is a topview of the system.

FIG. 3B is a cross-section of the system shown in FIG. 3A taken along a line extending along the core of the optical fiber and also a line perpendicular to a base of the optical device.

FIG. 6A is a topview of a portion of the system.

FIG. 6B is a cross-section of the system shown in FIG. 6A taken along a line extending along the core of the optical fiber and also a line perpendicular to a base of the optical device.

FIG. 7A is a topview of a portion of the system.

FIG. 7B is a cross-section of the system shown in FIG. 7A taken along a line extending along the core of the optical fiber and also a line perpendicular to a base of the optical device.

FIG. 8A is a cross section of the system taken along a reference plane.

FIG. 8B is a topview of the system shown in FIG. 8A.

FIG. 10A is a bottom view of the laser.

FIG. 10B is a cross-section of the laser shown in FIG. 10A taken along the line labeled B in FIG. 10A.

FIG. 10C is a cross-section of the laser shown in FIG. 10A taken along the line labeled C in FIG. 10A.

FIG. 10D is a topview of the laser.

FIG. 11B illustrates the optical device as shown in FIG. 11A and the laser as shown in FIG. 11A assembled into an optical system.

FIG. 11C is a cross section of the system shown in FIG. 11B taken along the longitudinal axis of the waveguide.

FIG. 12A is a cross-section of a laser bar such as the cross-section of FIG. 10C and is taken before the formation of the secondary stop is completed.

FIG. 12B illustrates the laser bar of FIG. 12A after a portion of the sub-layers are removed from the secondary stop of FIG. 12B.

DESCRIPTION

A system having a first optical device that exchanges light signals with a second optical device uses one or more actuators to achieve optical alignment between a waveguide facet on the first optical device and a second facet on the second optical device. The first optical device includes one or more actuators configured to move the waveguide facet relative to the second facet. The one or more optical actuators can be controlled by electronics. As a result, the position of the waveguide facet relative to the second facet can be controlled and/or tuned during or before use of the system.

The actuators can be vertical actuators and/or horizontal actuators. The use of both vertical actuators and horizontal actuators allows the movement and position of the waveguide facet to be controlled in two dimensions and can accordingly provide the most favorable degree of alignment.

Figure 1A:
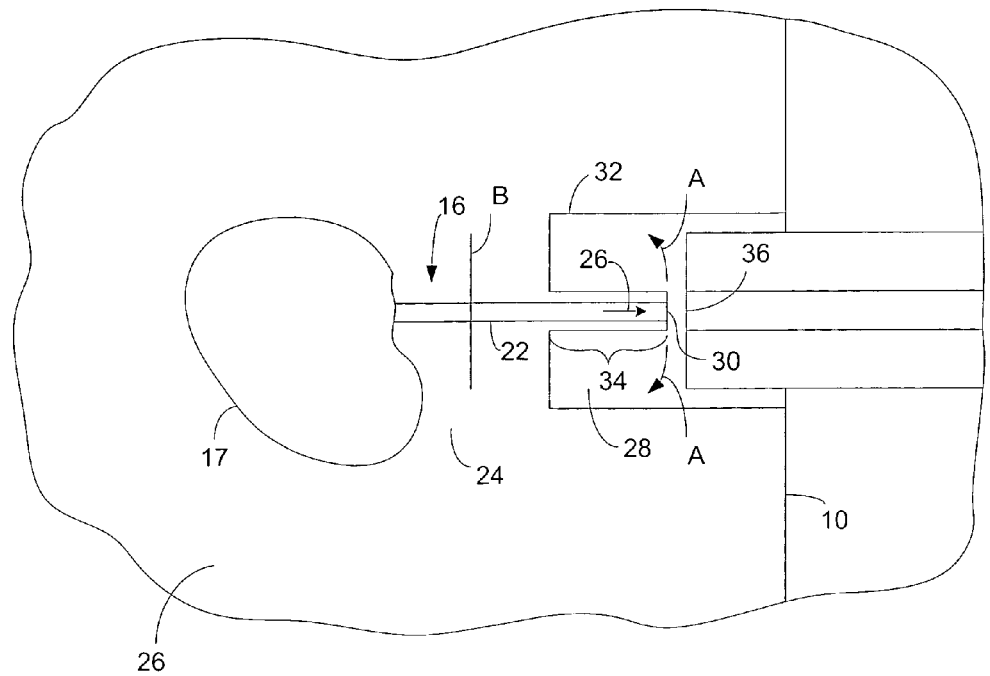
FIG. 1A through FIG. 1C illustrates system that includes a second optical device aligned with an optical device within the class of optical devices called planar optical devices.
Figure 1B:
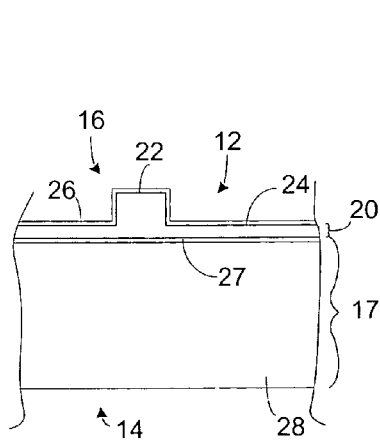
Figure 1C:
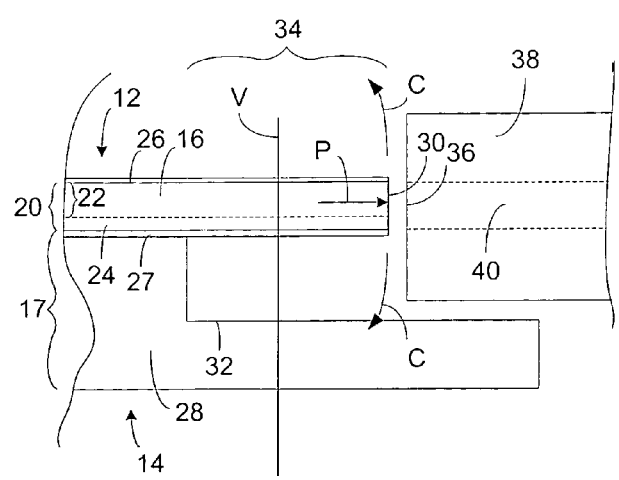

FIG. 1A through FIG. 1C illustrates system that includes a second optical device aligned with a first optical device. FIG. 1A is a topview of a portion of the system. FIG. 1B is a cross-section of the portion of the system shown in FIG. 1A taken along the line labeled B. FIG. 1C is a cross-section of the system shown in FIG. 1B taken along a line extending through the core of the optical fiber. The illustrated second optical device is an optical fiber.

The first optical device is within the class of optical devices known as planar optical devices. These devices typically include one or more waveguides that are wholly or partially immobilized relative to a substrate or a base. The direction of propagation of light signals along the waveguides is generally parallel to a plane of the substrate or a plane of the base 18. The illustrated device includes lateral sides 10 (or edges) extending from a top side 12 to a bottom side 14. The propagation direction of light signals along the length of the waveguides on a planar optical device generally extends through the lateral sides 10 of the first optical device. The top side 12 and the bottom side 14 of the first optical device are non-lateral sides.

The first optical device includes one or more waveguides 16 that carry light signals to and/or from optical components 17. Examples of optical components 17 that can be included on the first optical device include, but are not limited to, one or more components selected from a group consisting of entry/exit ports through which light signals can enter and/or exit a waveguide 16 from above or below the first optical device, multiplexers for combining multiple light signals onto a single waveguide, demultiplexers for separating multiple light signals such that different light signals are received on different waveguides, optical couplers, optical switches, lasers that act a source of a light signal, optical fibers that act a source of a light signal and/or receive light signals, amplifiers for amplifying the intensity of a light signal, attenuators for attenuating the intensity of a light signal, modulators for modulating a signal onto a light signal, light sensors that convert an optical signal to an electrical signal, and vias that provide an optical pathway for a light signal traveling through the first optical device from the bottom side 14 of the first optical device to the top side 12 of the first optical device. Additionally, the first optical device can optionally, include electrical components. For instance, the first optical device can include electrical connections for applying a potential or current to a waveguide and/or for controlling other components on the first optical device.

The waveguide 16 is defined in a first light-transmitting medium 20 positioned on a base 18. The first light-transmitting medium 20 includes a ridge 22 extending upward from slab regions 24 of the first light-transmitting medium 20. Suitable first light-transmitting media 20 include, but are not limited to, silicon, polymers, silica, SiN, GaAs, InP and LiNbO$_3$. A fourth light-transmitting medium 26 can optionally be positioned on the first light-light transmitting medium 20. The fourth light-transmitting medium 26 can serve as a cladding 38 for the waveguide 16 and/or for the first optical device. When the first light-transmitting medium 20 is silicon, suitable fourth light-transmitting media 26 include, but are not limited to, silicon, polymers, silica, SiN, GaAs, InP and LiNbO$_3$.

The portion of the base 18 adjacent to the first light-transmitting medium 20 is configured to reflect light signals from the waveguide 16 back into the waveguide 16 in order to constrain light signals in the waveguide 16. For instance, the portion of the base 18 adjacent to the first light-transmitting medium 20 can be an optical insulator 27 with a lower index of refraction than the first light-transmitting medium 20. The drop in the index of refraction can cause reflection of a light signal from the first light-transmitting medium 20 back into the first light-transmitting medium 20. The base 18 can include the optical insulator 27 positioned on a substrate 28. In one example, the first optical device is constructed on a silicon-on-insulator wafer. A silicon-on-insulator wafer includes a silicon layer that serves as the first light-transmitting medium 20. The silicon-on-insulator wafer also includes a layer of silica positioned on a silicon substrate. The layer of silica can serving as the optical insulator 27 and the silicon substrate can serve as the substrate 28.

As is evident in FIG. 1C, the waveguide 16 ends at a waveguide facet 30 through which light signal can exit and/or enter the first optical device. In FIG. 1C, the location of the slab region 24 is illustrated by dashed lines. A direction of propagation of light signals in the waveguide 16 at a location that is both at the waveguide facet 30 and on the waveguide side of the waveguide facet 30 is illustrated by the arrow labeled P in FIG. 1A and FIG. 1C. The light signals can also be propagated in a direction that is the opposite of the direction illustrated by the arrows labeled P. Since the direction of propagation of these light signals can change as the light signals travel through the waveguide facet 30, the direction of propagation for these light signals may be different on the waveguide 16 side of the waveguide facet 30 than they are on the other side of the facet.

A device receiving recess 32 is positioned between the waveguide facet 30 and a lateral side 10 of the first optical device. An alignment portion 34 of the waveguide 16 overhangs at least a portion of the device receiving recess 32. For instance, there is a gap between the alignment portion 34 of the waveguide 16 and the base 18 where the gap is filled with the atmosphere in which the first optical device is located. The gap allows the facet of the waveguide 16 to move relative to the base 18 and/or relative to a portion of the waveguide 16 that is immobilized relative to the base 18.

The portion of the base 18 located under the alignment portion 34 of the waveguide 16 is optional and need not be present in the first optical device. Although FIG. 1C illustrates a portion of the insulator 27 positioned under the alignment portion 34 of the waveguide 16, the portion of the insulator 27 under the alignment portion 34 of the waveguide 16 is optional and can be removed.

FIG. 1A through FIG. 1C illustrate a second optical device positioned in the device receiving recess 32. The second optical device includes a second facet 36 through which light signals exit and/or enter the second optical device. The second optical device is positioned such that light signals can be exchanged between the waveguide facet 30 and the second facet 36. For instance, the second optical device is positioned such that a gas such as air is located between the waveguide facet 30 and the second facet 36 and a light signal that exits from the facet 30 enters the second facet 36 and/or a light signal that exits from the second facet 36 enters the facet 30.

The first optical device illustrated in FIG. 1A through FIG. 1C includes one or more actuators configured to move the waveguide facet 30 relative to the base 18 and/or relative to the second facet 36. For instance, each actuator moves the waveguide facet 30 relative to the second facet 36 such that a location where a line is incident on the second facet changes upon use of the actuator. The line being a line through the waveguide facet and parallel to the direction of propagation of light signals in the waveguide 16 at a location that is both at the waveguide facet 30 and on the waveguide side of the waveguide facet 30. In order to better illustrate the relationships between the various components of the system, the components of the one or more actuators are not shown in FIG. 1A through FIG. 1C.

In FIG. 1A and FIG. 1C, the alignment portion 34 of the waveguide 16 is shown in the rest position. In the rest position, the one or more actuators have not been engaged and accordingly do not affect the position of the waveguide facet 30. The actuators can include one or more horizontal actuators configured to move the waveguide facet 30 from the rest position in a horizontal direction relative to the base 18. For instance, this movement is shown by the arrows labeled A in FIG. 1A. The one or more horizontal actuators can be configured to change the distance between the waveguide facet 30 and a reference plane that includes a vertical line and a non-actuated line. The vertical line extends through the waveguide 16 and is perpendicular to a plane of the base 18 as illustrated by the line labeled V in FIG. 1C. The non-actuated line is parallel to the direction of propagation of the light signals in the waveguide 16 at a location that is both at the waveguide facet 30 and on the waveguide 16 side of the waveguide facet 30. If the non-actuated line were determined when the actuator was engaged so as to change the location of the waveguide facet 30, the location of the reference plane could change with use of the horizontal actuator. As a result, the non-actuated line is determined at a time when the actuator is not engaged so as to affect a location of the waveguide facet 30 in order to provide a stable reference plane. Since the one or more horizontal actuators are configured to change the distance between the waveguide facet 30 and the reference plane, the one or more horizontal actuators can be used to achieve horizontal alignment between the waveguide facet 30 and the second facet 36.

Additionally or alternately, the actuator can include one or more vertical actuators configured to move the waveguide facet 30 from the rest position in a horizontal direction relative to the base 18. For instance, this movement can be illustrated by the arrows labeled C in FIG. 1C. The vertical actuator can be configured to move the waveguide facet 30 in a plane that is parallel to the reference plane. Accordingly, the vertical actuator does not substantially change the distance between the waveguide facet 30 and the reference plane.

Figure 2A:
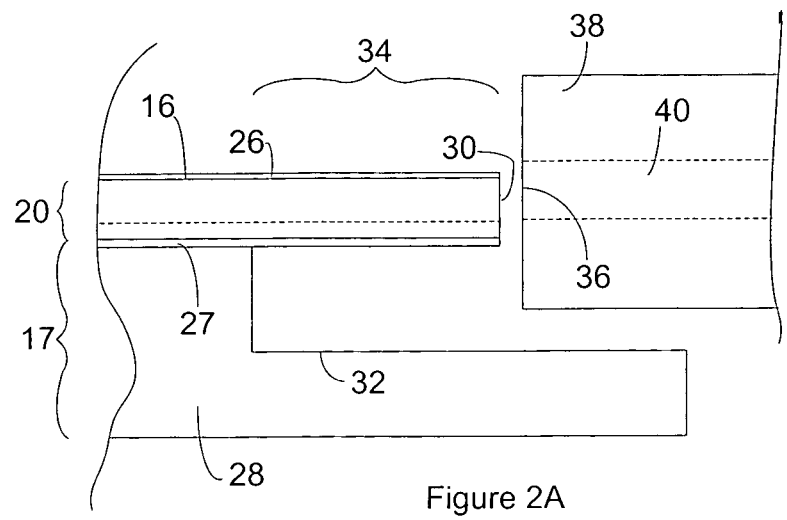
FIG. 2A and FIG. 2B are each a cross section of the system shown in FIG. 1A through FIG. 1C taken along a reference plane.
Figure 2B:
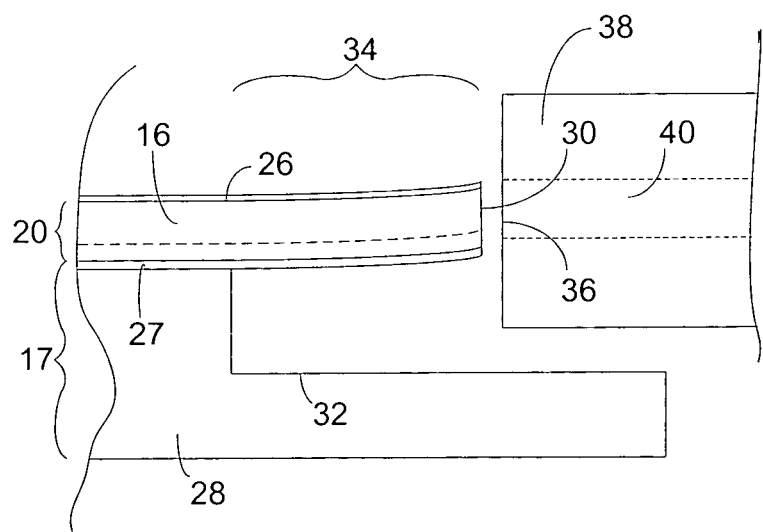

FIG. 2A and FIG. 2B illustrate use of the one or more actuators to achieve alignment with the second facet 36. For instance, FIG. 2A and FIG. 2B are each a cross section of the system shown in FIG. 1A through FIG. 1C taken along the reference plane. FIG. 2A shows the alignment portion 34 of the waveguide 16 in the rest position. In the rest position, the one or more actuators have not been engaged and accordingly do not affect the position of the waveguide 16. In the rest position, FIG. 2A shows the second facet 36 positioned above the position where the second facet 36 would be optically aligned with the waveguide facet 30. As a result, the system of FIG. 2A will be associated with an undesirable level of optical loss.

FIG. 2B illustrates the one or more actuators being operated so as to bring the waveguide facet 30 into alignment with the second facet 36. In particular, FIG. 2B illustrates the one or more actuators operated so as to bend the alignment region of the waveguide 16 upwards until the waveguide facet 30 and the second facet 36 are optically aligned.

Although FIG. 2A and FIG. 2B use vertical alignment to illustrate the principle of operation of the one or more actuators, the example of FIG. 2A and FIG. 2B can also be applied to horizontal alignment. Further, the example of FIG. 2A and FIG. 2B can be used in conjunction with horizontal alignment. Accordingly, the system can be configured to have horizontal alignment and/or vertical alignment.

Figure 3A:
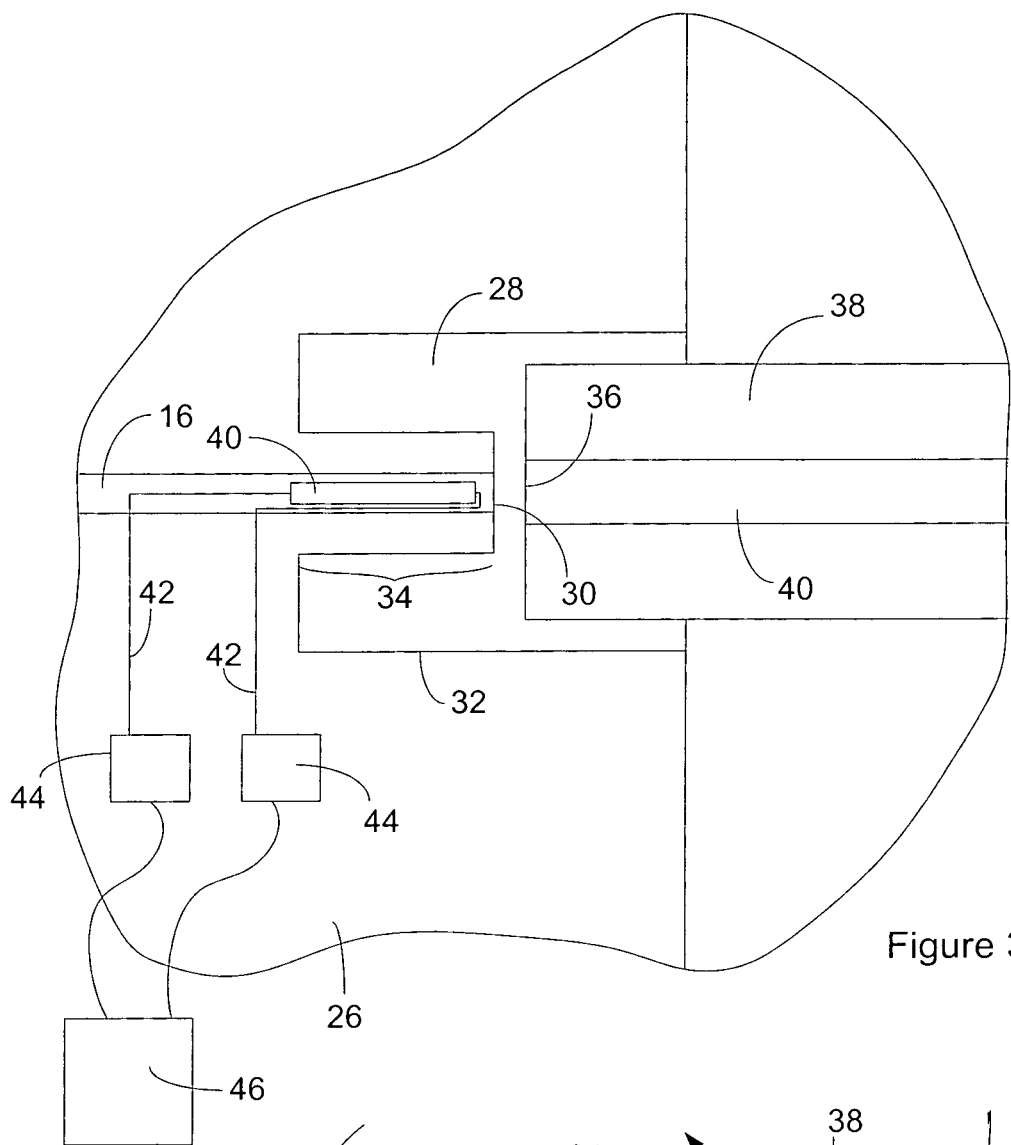
FIG. 3A through FIG. 3B illustrate a suitable construction of a vertical actuator.
Figure 3B:
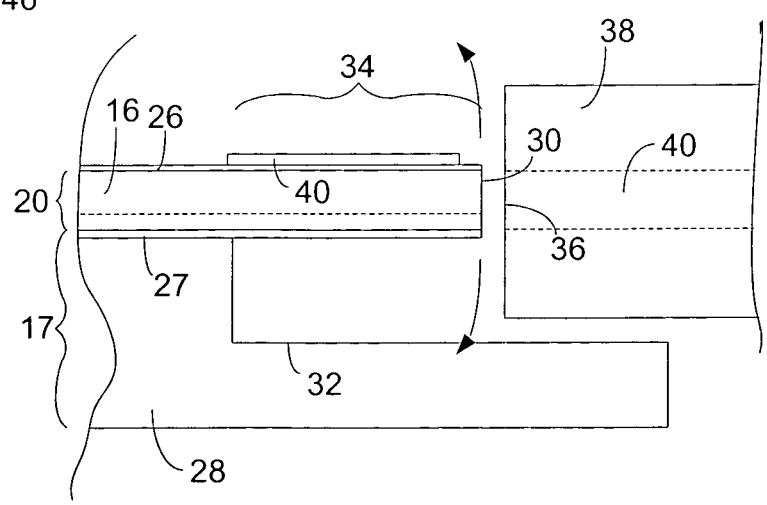

FIG. 3A through FIG. 3B illustrate a suitable construction of a vertical actuator. FIG. 3A is a topview of a portion of the system. FIG. 3B is a cross-section of the system taken along the reference plane.

The vertical actuator includes a resistive heating element 40 positioned on at least a portion of the alignment portion 34 of the waveguide 16. Electrical conductors 42 provide electrical communication between the resistive heating element and contact pads 44. As a result, the contact pads 44 can be used to provide electrical communication between the resistive heating element and control electronics 46. The control electronics 46 can apply an electrical current to the resistive heating element in order to elevate the temperature of the resistive heating element. The heat can also flow into the alignment portion 34 of the waveguide 16 and can accordingly increase the temperature of the alignment portion 34 of the waveguide 16. The different components on and under the alignment portion 34 of the waveguide 16 along with the alignment portion 34 of the waveguide 16 itself can have different coefficients of expansion. The different coefficients of expansion cause the alignment portion 34 of the waveguide 16 to bend as illustrated by the arrows labeled B in FIG. 3B (see also FIG. 2B). This effect is a result of what is commonly called the "bi-metal effect" or "bi-metal strip." Allowing the alignment portion 34 of the waveguide 16 to cool allows the waveguide facet 30 to move back toward the rest position. Allowing the alignment portion 34 of the waveguide 16 to cool to the atmospheric temperature allows the waveguide facet 30 to return to the rest position. Accordingly, the electronics 46 can control the upward and downward motion of the waveguide facet 30.

The materials and dimensions of the resistive heating element, the different components on and under the alignment portion 34 of the waveguide 16, and the alignment portion 34 of the waveguide 16 itself are chosen such that the alignment portion 34 of the waveguide 16 bends in a particular direction upon heating. For instance, the materials and dimensions of these components can be selected such that the alignment portion 34 of the waveguide 16 bends upward from the rest position upon heating. Alternately, the materials and dimensions of these components can be selected such that the alignment portion 34 of the waveguide 16 bends downward from the rest position upon heating. These selection can be made using the coefficient of expansion of possible materials to identify the temperature response of the alignment portion 34 in accordance with the "bi-metal effect."

In the event that the system includes a single vertical actuator configured to move the waveguide facet 30 on only one side of the rest position, the device receiving recess 32 can be configured so the second facet 36 is at a position where movement of the waveguide facet 30 on that side is needed to achieve the desired alignment. For instance, if the system includes a single vertical actuator configured to move the waveguide facet 30 upward from the rest position, the device receiving recess 32 can be configured so that receipt of the second optical device in the device receiving recess 32 causes the second facet 36 to be positioned above the position where optical alignment would be achieved between the second facet 36 and the waveguide facet 30 in the rest position. As a result, the upward movement of the waveguide facet 30 provided by the vertical actuator is needed to provide the desired optical alignment. As a result, designing the device receiving recess 32 so the second facet 36 is positioned above the position where optical alignment would be achieved between the second facet 36 and the waveguide facet 30 in the rest position ensures that the vertical actuator moves the waveguide facet 30 in a direction that results in alignment.

As will be described in more detail below, the one or more actuators can include a second vertical actuator in addition to the vertical actuator of FIG. 3A and FIG. 3B. The second vertical actuator can be used to move the waveguide facet 30 in a direction that is the opposite of the direction that the vertical actuator of FIG. 3A and FIG. 3B moves the waveguide facet 30 upon heating. As a result, the system can include vertical actuators configured to move the waveguide facet 30 into a position on either side of the rest position. In this case, the device receiving recess 32 can be configured so that receipt of the second optical device in the device receiving recess 32 causes the second facet 36 to be positioned as close to optically aligned with the waveguide facet 30 as is possible. This may result in the second facet 36 being positioned either above or below the aligned position. However, the vertical actuators will still be able to achieve alignment as a result of the ability of the vertical actuators to move the waveguide facet 30 upward or downward from the rest position.

Although the vertical actuator of FIG. 3A through FIG. 3B is disclosed as including a resistive heating element, other types of heaters can be employed. Additionally, although the resistive heating element is described as contributing to the bending of the alignment portion 34 of the waveguide as a result of the "bi-metal effect," the presence of the insulator 27 and/or cladding 38 on the alignment portion 34 of the waveguide 16 can result in bending upon heating of these components. As a result, additional materials such as the resistive heating element need not be present on the alignment portion 34 of the waveguide 16 in order to achieve movement of the waveguide facet 30.

Figure 4:
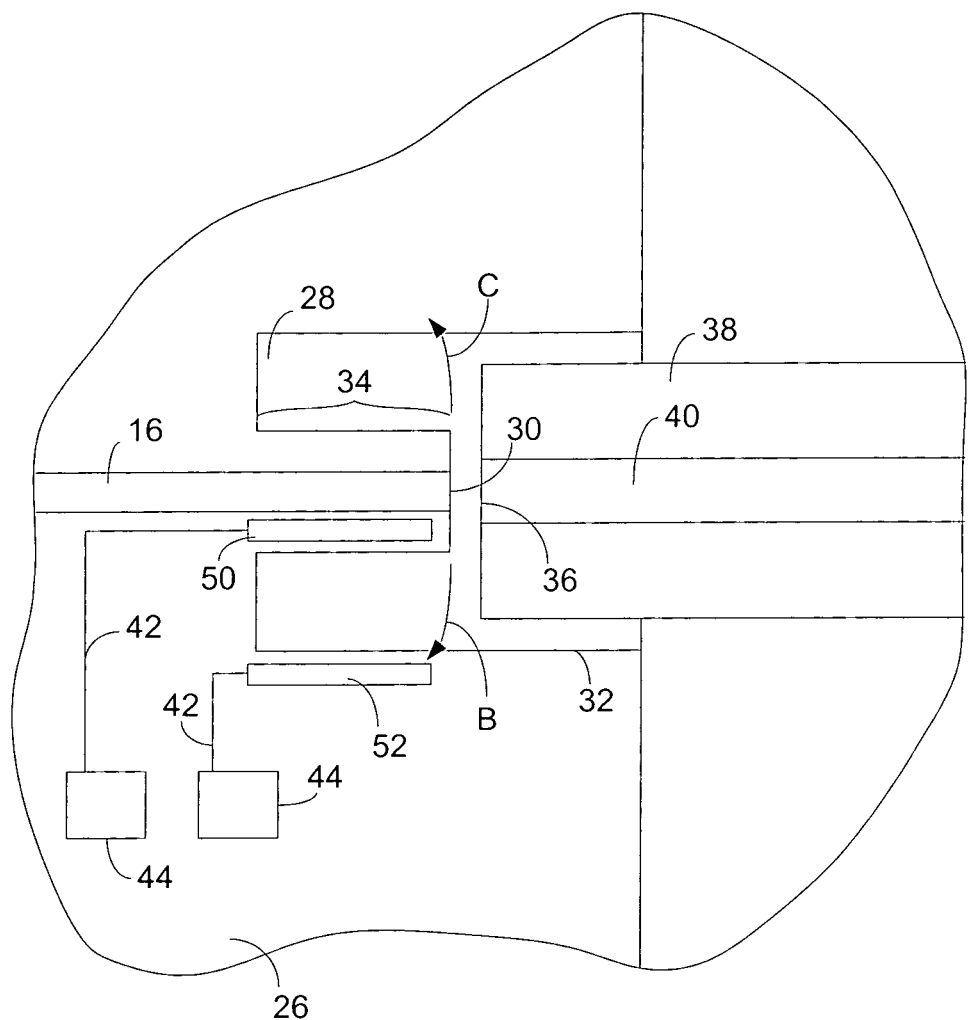
FIG. 4 is a topview of a system having a horizontal actuator that includes multiple electrodes.

FIG. 4 is a topview of a system having a horizontal actuator that includes multiple electrodes. A first electrode 50 is positioned on the slab region 24 and adjacent to the alignment portion 34 of the waveguide 16. A second electrode 52 is also positioned on the slab region 24 but is spaced apart from the first electrode 50 such that a portion of the device receiving recess 32 is located between the first electrode 50 and the second 52 electrode 50. In other words, a line segment extending from the first electrode 50 to the second 52 electrode 50 would be positioned over the bottom of a portion of the device receiving recess 32.

Electrical conductors 42 provide electrical communication between the electrodes and contact pads 44. The contact pads 44 can be used to provide electrical communication between the electrodes and control electronics 46. The control electronics 46 can apply opposite potentials to the electrodes. For instance, the control electronics 46 can apply a positive potential to the first electrode 50 and a negative potential to the second 52 electrode 50. The opposing potentials result in an electrostatic attraction between the first electrode 50 and the second 52 electrode 50. As a result, the opposing potentials cause the waveguide facet 30 to move from the rest position in the direction of the arrow labeled B in FIG. 4. Alternately, the control electronics 46 can apply the same potential to each of the electrodes. For instance, the control electronics 46 can apply a positive potential to the first electrode 50 and a positive potential to the second 52 electrode 50. These potentials result in an electrostatic repulsion between the first electrode 50 and the second 52 electrode 50. As a result, the opposing potentials cause the waveguide facet 30 to move from the rest position in the direction of the arrow labeled C in FIG. 4. Accordingly, the electronics 46 can control the horizontal motion of the waveguide facet 30 on both the left and right sides of the rest position.

Although FIG. 4 illustrates the first electrode 50 positioned on the slab region 24, the electrodes need not be positioned on the slab region 24. For instance, the first electrode 50 can optionally be positioned on the ridge 22 of the waveguide 16 or can be positioned on both the ridge 22 and the slab region 24.

Figure 5:
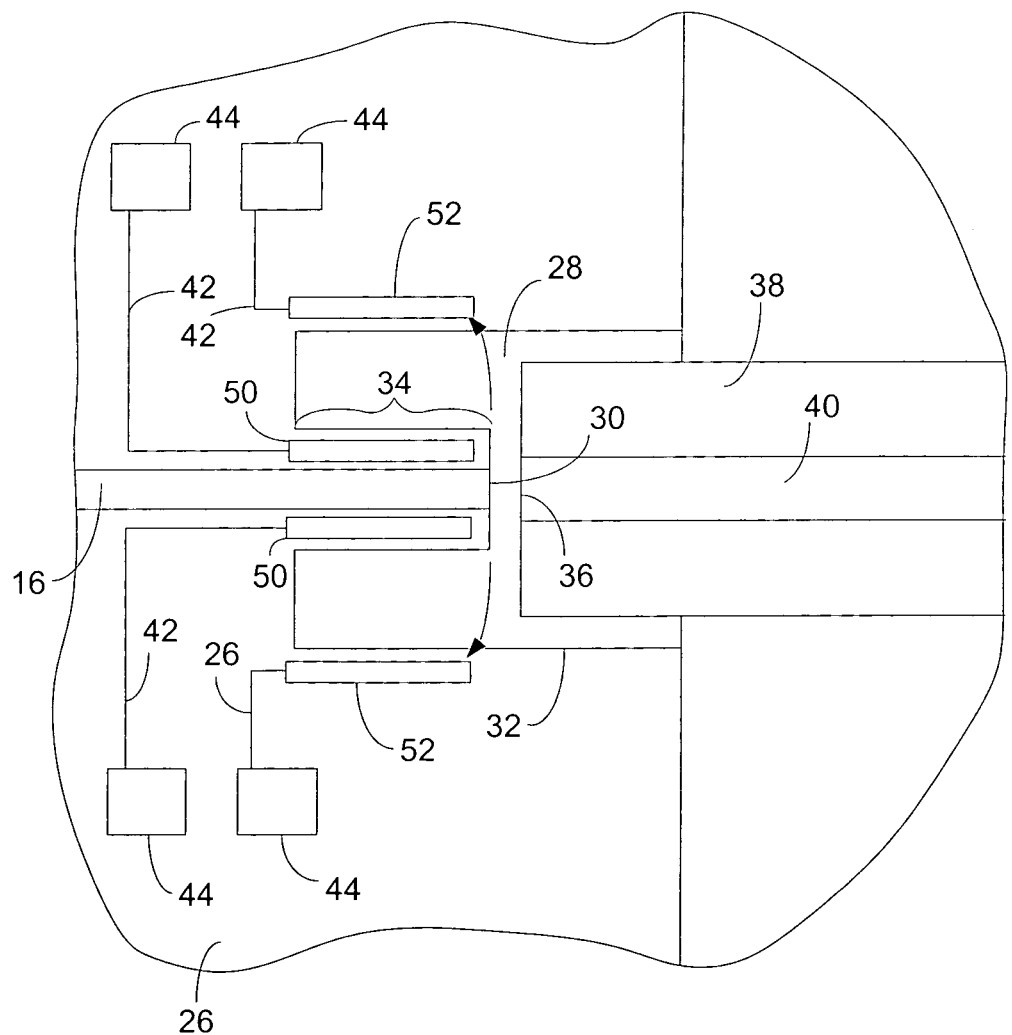
FIG. 5 is a topview of a system having multiple horizontal actuators that each includes multiple electrodes.

The first optical device can optionally include a second horizontal actuator. For instance, FIG. 5 is a topview of a system having multiple horizontal actuators that each includes multiple electrodes. The electronics 46 can be configured to apply a potential to each of the electrodes independently of the other electrodes. Additionally or alternatively, the electronics 46 can operate the first horizontal actuator and the second horizontal actuator to oppose one another.

Figure 6A:
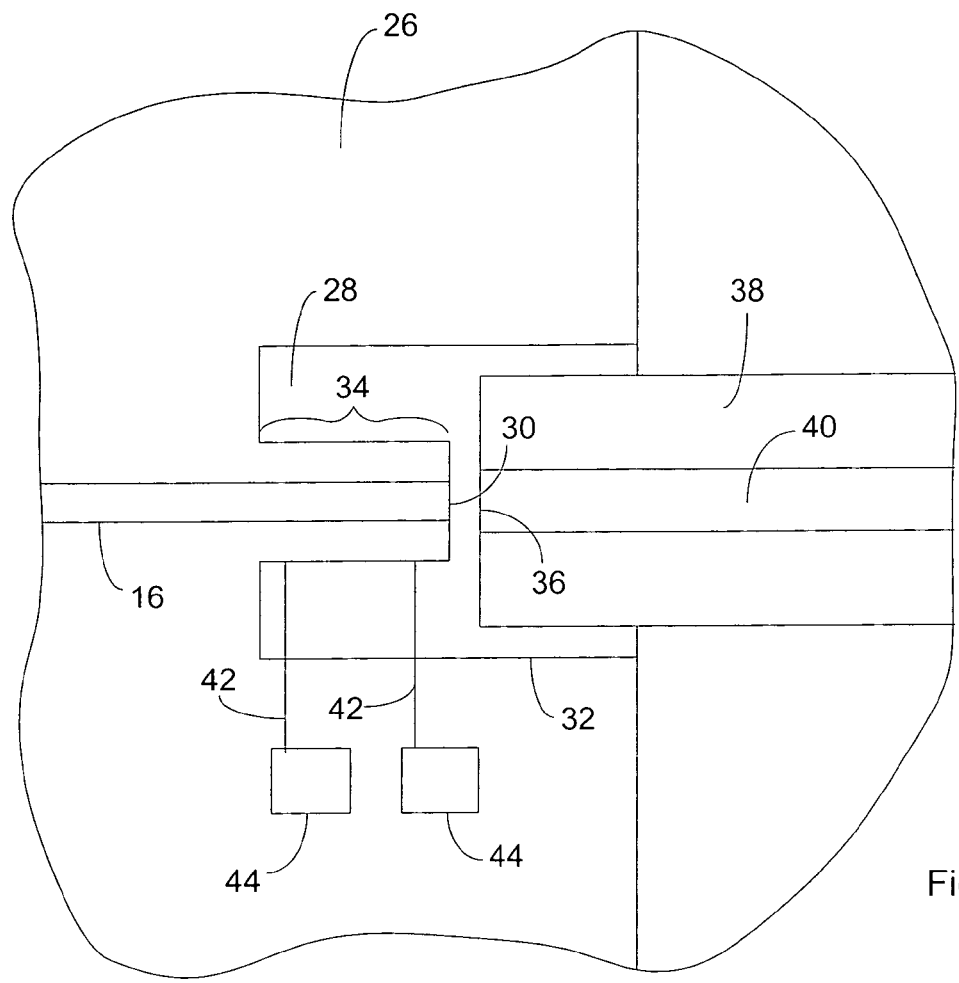
FIG. 6A through FIG. 6B illustrates a system having a vertical actuator that employs electrostatics.
Figure 6B:
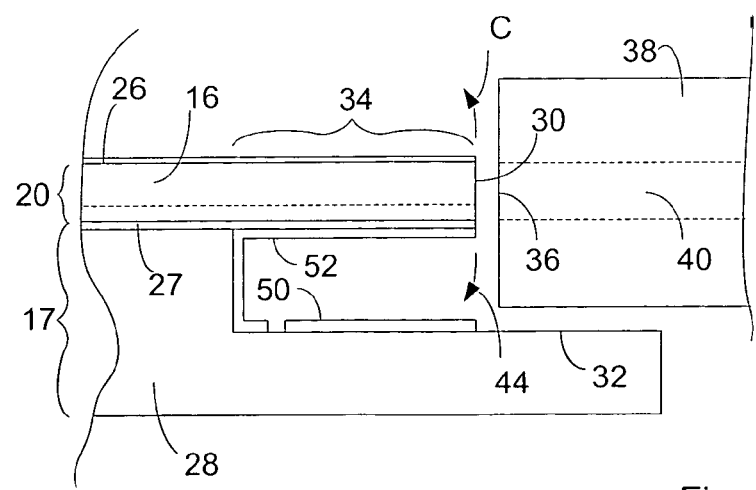

The electrostatic principle used for the horizontal actuator of FIG. 4 and FIG. 5 can also be employed to provide a vertical actuator. For instance, FIG. 6A through FIG. 6B illustrates a system having a vertical actuator that employs electrostatics. FIG. 6A is a topview of a portion of the system. FIG. 6B is a cross-section of the system taken along the reference plane.

The vertical actuator includes multiple electrodes. A first electrode 50 is positioned in the device receiving recess 32 below the alignment portion 34 of the waveguide 16. A second 52 electrode 50 is positioned between the first electrode 50 and the alignment portion 34 of the waveguide 16 and is also spaced apart from the first electrode 50.

Electrical conductors 42 provide electrical communication between the electrodes and contact pads 44. The contact pads 44 can be used to provide electrical communication between the electrodes and control electronics 46. The control electronics 46 can apply opposite potentials to the electrodes. For instance, the control electronics 46 can apply a positive potential to the first electrode 50 and a negative potential to the second 52 electrode 50. The opposing potentials result in an electrostatic attraction between the first electrode 50 and the second 52 electrode 50. As a result, the opposing potentials cause the waveguide facet 30 to move from the rest position in the direction of the arrow labeled B in FIG. 6B. Alternately, the control electronics 46 can apply the same potential to each of the electrodes. For instance, the control electronics 46 can apply a positive potential to the first electrode 50 and a positive potential to the second 52 electrode 50. These potentials result in an electrostatic repulsion between the first electrode 50 and the second 52 electrode 50. As a result, the opposing potentials cause the waveguide facet 30 to move from the rest position in the direction of the arrow labeled C in FIG. 4. Accordingly, the electronics 46 can control the vertical motion of the waveguide facet 30 in a direction that is above the rest position and also in a direction that is below the rest position.

A system can include a first vertical actuator according to FIG. 6A and FIG. 6B and also a second vertical actuator constructed according to FIG. 3A and FIG. 3B. The electronics 46 can operate the first vertical actuator and the second vertical actuator to complement one another and can accordingly increase the level of vertical displacement that can be achieved for the waveguide facet 30. Additionally or alternately, the electronics 46 can operate the first vertical actuator and the second vertical actuator to move the waveguide facet 30 in opposing directions. For instance, the electronics 46 can operate the first vertical actuator when it is desirable to move the waveguide facet 30 in an upward direction and the second vertical actuator when it is desirable to move the actuator in a downward direction. As a result, the electronics 46 can control the vertical motion of the waveguide facet 30 in a direction that is above the rest position and also in a direction that is below the rest position.

Figure 7A:
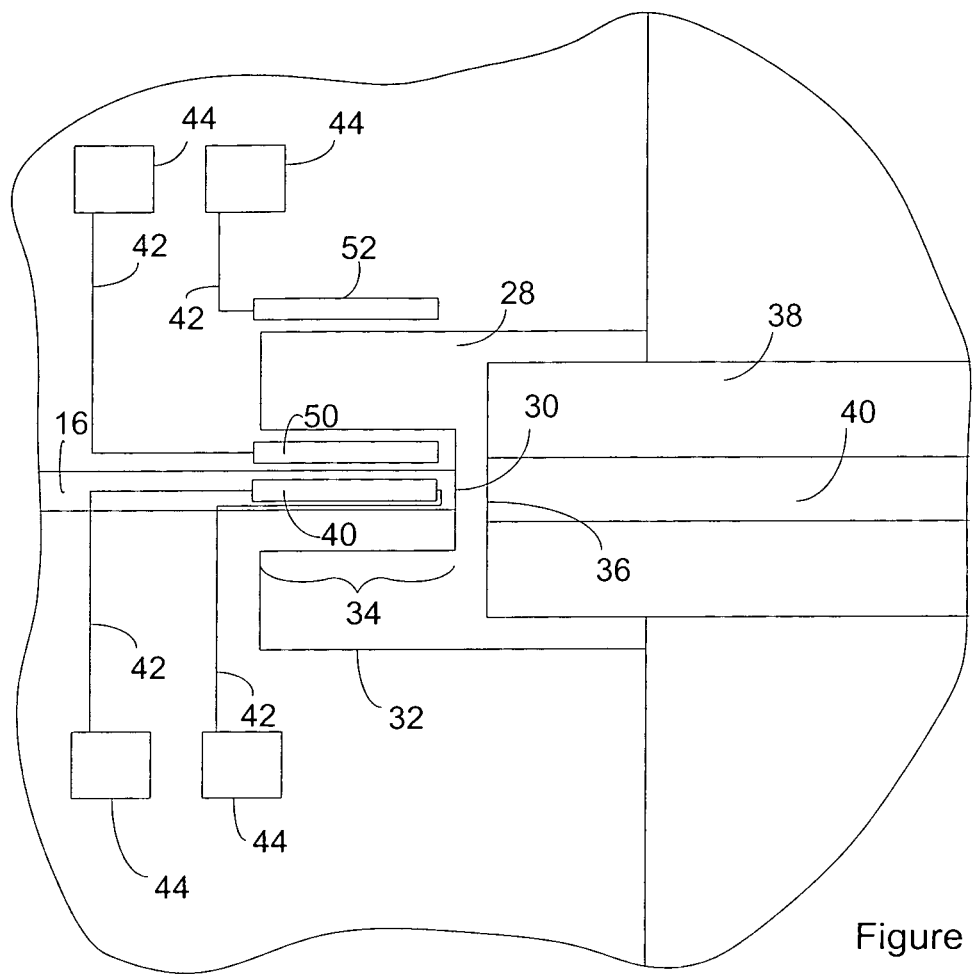
FIG. 7A and FIG. 7B illustrate a system having a horizontal actuator and a vertical actuator.
Figure 7B:
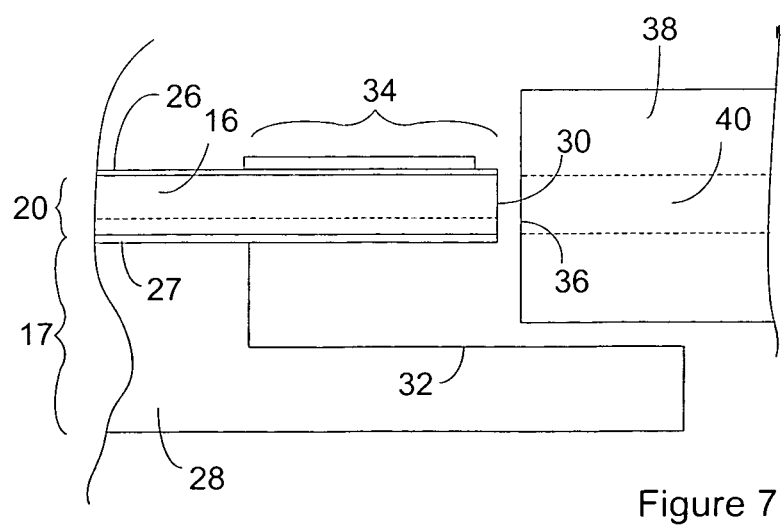

The system can include both horizontal actuators and vertical actuators as disclosed above. For instance, FIG. 7A and FIG. 7B illustrate a system having a horizontal actuator and a vertical actuator. FIG. 7A is a topview of a portion of the system. FIG. 7B is a cross-section of the system taken along the reference plane. The system includes a horizontal actuator constructed according to FIG. 4 and a vertical actuator according to FIG. 3A and FIG. 3B. As a result, the electronics 46 can move the waveguide facet 30 vertically and/or horizontally from the rest position.

Although the one or more actuators are disclosed as having a horizontal actuator for generating horizontal motion and a vertical actuator for generating vertical motion, the one or more horizontal actuators and the one or more vertical actuators can be combined into a single device.

Figure 8A:
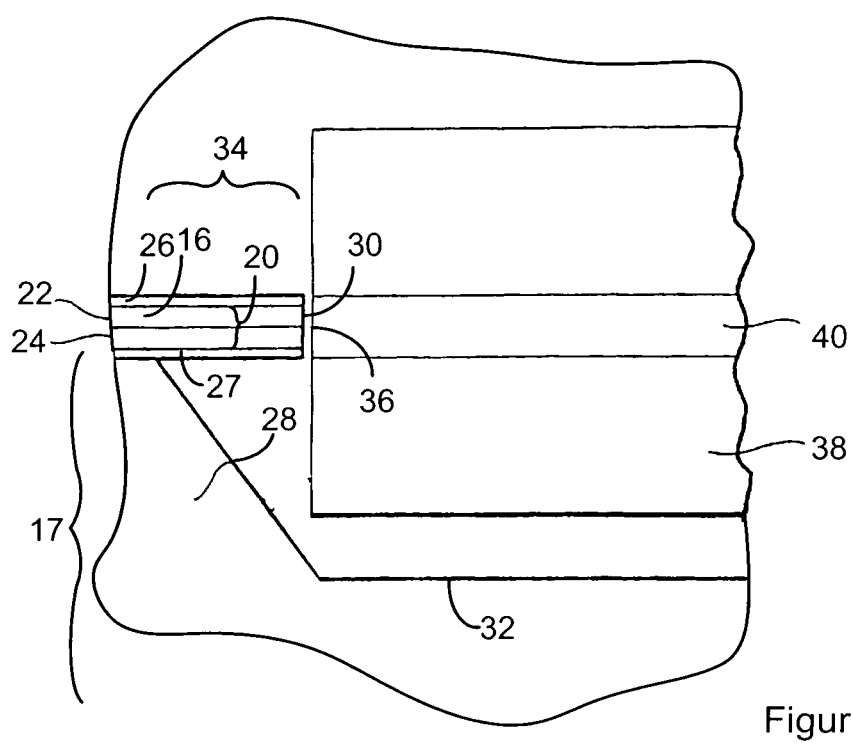
FIG. 8A through FIG. 8B illustrate a suitable construction for a system on a silicon-on-insulator wafer.
Figure 8B:
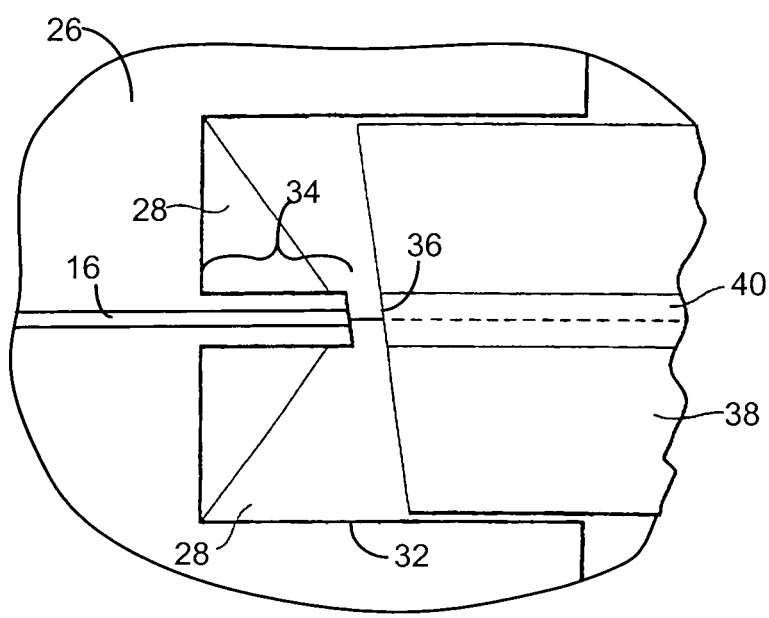

FIG. 8A through FIG. 8B illustrate a suitable construction for a system on a silicon-on-insulator wafer. FIG. 8A is a cross section of the system taken along the reference plane. FIG. 8B is a topview of the system. FIG. 8A through FIG. 8B are presented in order to provide an example construction of the first optical device. As a result, the one or more vertical actuators and/or the one or more horizontal actuators are not shown in the system of FIG. 8A through FIG. 8B.

The device receiving recess 32 is defined by a v-groove formed in the substrate 28. The optical fiber is positioned in the v-groove. Accordingly, when the alignment portion 34 of the waveguide 16 is in the rest position, the location of the v-groove can determine the horizontal alignment of the second facet 36 with the waveguide facet 30. Additionally, when the alignment portion 34 of the waveguide 16 is in the rest position, the depth of the v-groove can determine the vertical alignment of the second facet 36 with the waveguide facet 30.

The v-groove can be formed as a natural result of etching the silicon substrate of a silicon-on-insulator wafer along the crystal planes. A method for forming an first optical device according to FIG. 8A through FIG. 8B can be found in U.S. patent application Ser. No. 08/643,476, filed on May 6, 1996, entitled "Connection Between an Integrated Optical Waveguide and an Optical Fiber," granted U.S. Pat. No. 5,787,214, and incorporated herein in its entirety.

The electrodes, resistive heater(s), electrical conductors 42, and contact pads 44 can be form on the first optical device using traditional integrated circuit fabrication techniques. For instance, each of these components can be a metal trace placed on the first optical device.

The second optical device can be bonded to and/or mounted on the first optical device using an adhesive. For instance, when the second optical device is an optical fiber and the device receiving recess 32 includes a V-groove, an adhesive (not shown) can be employed to immobilize the optical fiber in the V-groove. In one example, an adhesive contacts the optical fiber and at least one surface of the V-groove without being positioned over the second facet 36. Suitable adhesives include, but are not limited to, epoxies including thermosetting epoxies and UV curing epoxies.

The second optical device illustrated in FIG. 1A through FIG. 8B is an optical fiber. However, the second optical device can be other devices that are independent from the first optical device but are configured to be temporarily or permanently coupled to the first optical device, bonded to the first optical device, or mounted on the first optical device. Examples of suitable second optical devices include, but are not limited to, other planar optical devices, lasers, and light sensors. Other planar optical devices can include components such as lasers, and light sensors. The optical fiber includes a cladding 38 on a core 40. Light signals are guided in the core 40 of the optical fiber.

Figure 9:
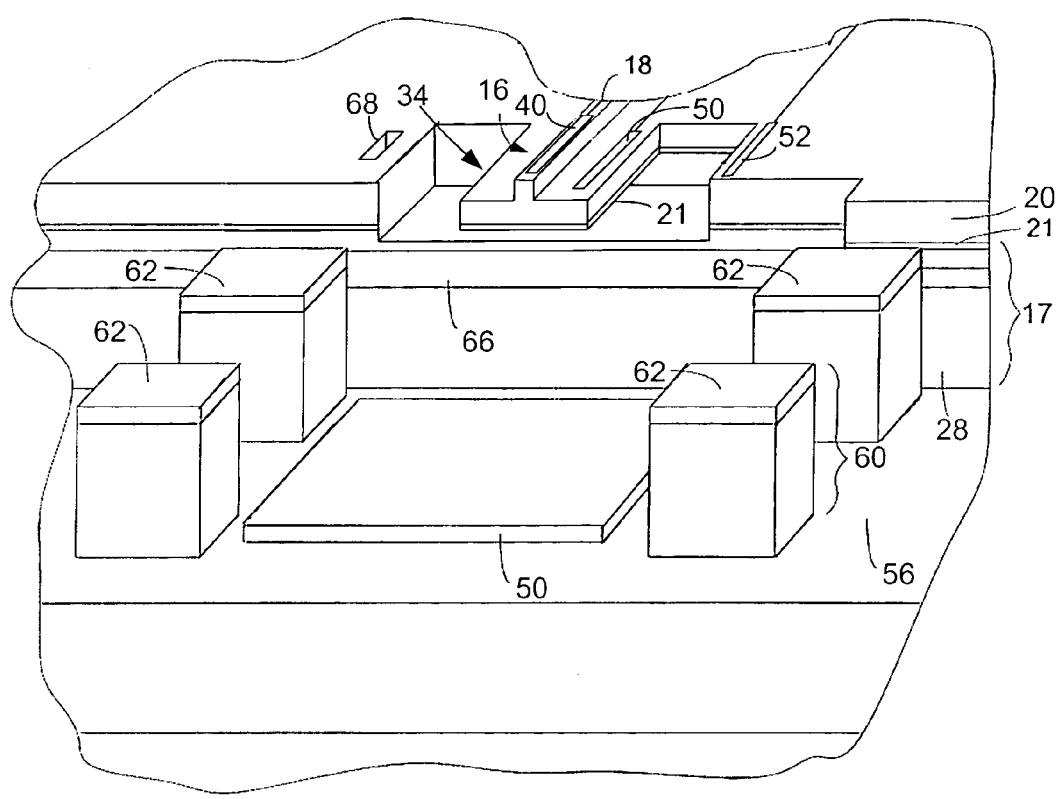
FIG. 9 is a perspective view of an optical device configured to be used with a laser serving as the second optical device.

FIG. 9 is a perspective view of an optical device configured to be used with a laser serving as the second optical device. The optical device includes one or more vertical actuators and/or one or more horizontal actuators for moving a waveguide facet on the optical device relative to a facet of the laser. The laser is not illustrated in FIG. 9 in order to make the portion of the optical device under the laser visible.

A recess extends into the base 17 to form a laser platform 56. A contact pad 58 positioned on the laser platform 56 can be employed for providing electrical communication with a laser on the laser platform 56. One or more stops 62 extend upward from the laser platform 56. For instance, FIG. 9 illustrates four stops 62 extending upward from the laser platform 56. The stops 62 include a cladding 63 positioned on a base portion 64. The substrate 28 can serve as the base portion 64 of the stops 62 and the stop 62 can exclude the light insulator 21 or be made of the same material as the light insulator 21. The portion of the substrate 28 included in the stops 62 can extend from the laser platform 56 up to the level of the light insulator 21. For instance, the stops 62 can be formed by etching through the light insulator 21 and using the underlying substrate 28 as an etch-stop. The cladding 63 can then be formed on the first light-transmitting medium 20 at the same time the cladding 63 is formed on the base portion 64 of the stops 62.

A secondary platform 66 is positioned between the waveguide facet 30 and the laser platform 56. The secondary platform 66 is elevated relative to the laser platform 56. For instance, the secondary platform 66 can be above the laser platform 56 and at or below the level of the light insulator 21. FIG. 9 shows the secondary platform 66 below the level of the light insulator 21 secondary platform 66; however, the second platform the top of the substrate 28 can serve as the secondary platform 66. The secondary platform 66 can be etched at a different time than the portion of the stops 62 that is defined by the substrate 28. Alternately, the secondary platform 66 can be etched concurrently with the base portion 64 of the stops 62 resulting in the secondary platform 66 and the base portion 64 of the stops 62 having about the same height above the laser platform 56.

The optical device includes one or more alignment marks 68. Suitable marks include recesses that extend into the optical device. An alignment recess 98 can extend into the first light-transmitting medium 20 and/or the base. In some instances, one or more of the alignment recesses 98 extend into the secondary platform 66. FIG. 9 illustrates alignment recesses 98 extending into the first light-transmitting medium 20. During attachment of a laser to the optical device, the alignment recesses 98 can be aligned with secondary alignment recesses 98 on the laser 60 in order to achieve horizontal alignment of the laser relative to the optical device.

The optical device of FIG. 9 is suitable for use with a laser. Suitable lasers include, but are not limited to, semiconductor lasers. Semiconductor lasers use a semiconductor or combinations of semiconductors as the gain medium 70 where the light signals are excited. One example of a semiconductor laser is a solid-state device having two outer semiconductor layers separated by one or more middle layers and generates laser radiation when charge carriers of opposite polarity, one each from the top and bottom layers, meet in the one or more middle layer.

Although a cladding is not shown on the first light-transmitting medium 20 of the optical device shown in FIG. 9, a cladding can be present over the waveguide and/or in the trenches that define the ridge of the waveguide.

Figure 10A:
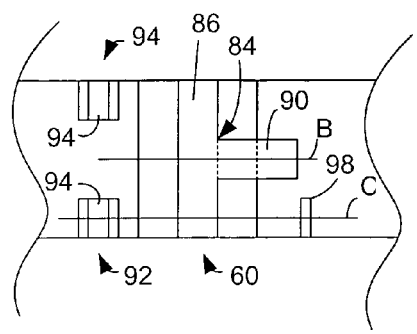
FIG. 10A through FIG. 10D illustrate a semiconductor laser that is suitable for use with an optical device constructed according to FIG. 9.
Figure 10B:
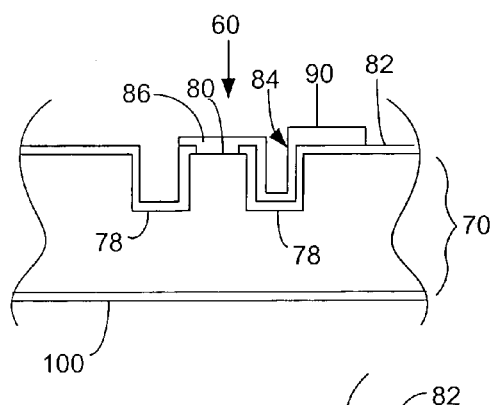
Figure 10C:
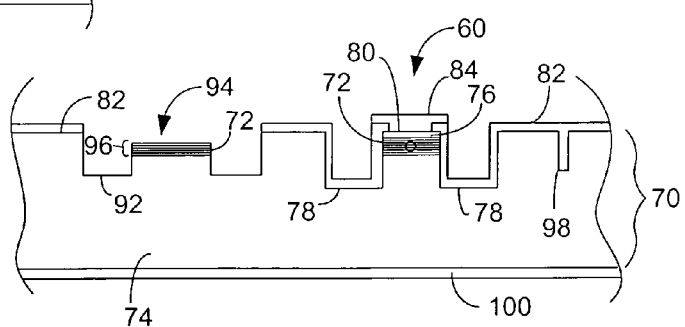
Figure 10D:
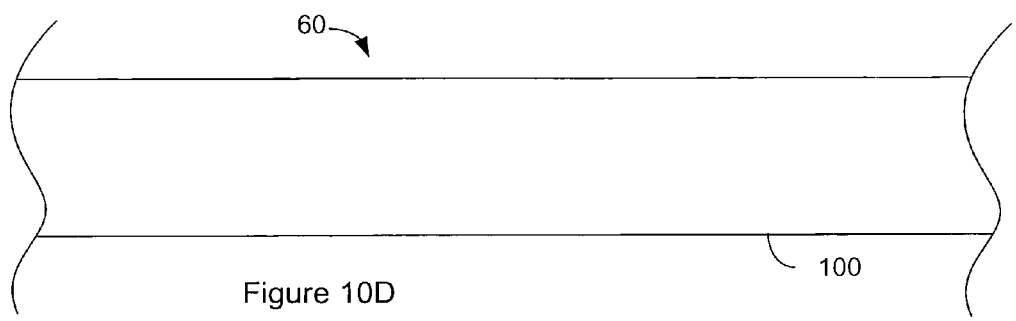

FIG. 10A through FIG. 10D illustrate a semiconductor laser 60 that is suitable for use with an optical device constructed according to FIG. 9. FIG. 10A is a bottom view of the laser 60. FIG. 10B is a cross-section of the laser 60 shown in FIG. 10A taken along the line labeled B in FIG. 10A. FIG. 10C is a cross-section of the laser 60 shown in FIG. 10A taken along the line labeled C in FIG. 10A. FIG. 10D is a topview of the laser 60.

The laser 60 is defined in a gain medium 70 where light signals are lased. The gain medium 70 includes sub-layers 72 between a lower gain medium 74 and an upper gain medium 76. The lower gain medium 74 and the upper gain medium 76 can be the same or different. Suitable lower gain media include, but are not limited to, InP, InGaAsP, and GaAs. Suitable upper gain media include, but are not limited to, InP, InGaAsP, and GaAs. As will be discussed in more detail below, each of the sub-layers 72 can have a different composition of a material than the one or more sub-layers 72 that contact that layer sub-layer 72. In some instances, each of the sub-layers 72 has a different chemical composition. Each sub-layer 72 or a portion of the sub-layers 72 can include or consists of two or more components of selected from a group consisting of In, P, Gs, and As. In some instances, the upper gain medium 76 is optional.

The laser 60 includes a laser facet through which a light signal exits the laser 60. As is known in the laser arts, the facets of the gain medium 70 can include fully reflective materials and/or partially reflective materials (not shown) positioned so as to provide amplification of the light signal in the gain medium 70. Trenches extending into the gain medium 70 define a laser ridge 62 in the gain medium 70.

A laser cladding 82 is positioned on the gain medium 70. A first electrical conductor 84 positioned on the cladding includes a contact region 86 that extends through an opening in the laser cladding 82 into contact with a top of the laser ridge 62. The first electrical conductor 84 extends from the contact region 86 across a trench to a contact pad 90. The contact pad 90 can be employed to apply electrical energy to the laser 60.

The laser 60 can be positioned adjacent to one or more alignment trenches 92 and/or between alignment trenches 92. For instance, FIG. 10A illustrates the laser 60 adjacent to an alignment trench 92. A secondary stop 94 extends upward from the bottom of the alignment trench 92. The secondary stop 94 can include an alignment layer 96 on top of the lower gain medium 74. The alignment layer 96 can include or consist of one or more sub-layers 72 in contact with one another. The choice of the depth of the alignment layer 96 below the bottom surface of the laser chip determines the vertical alignment between the lasers and the waveguide facets 30.

The alignment layer 96 illustrated in FIG. 10C includes several sub-layers 72. As will be explained in more detail below, these sub-layers 72 can correspond to sub-layers 72 in the laser ridge 62 which can define the location of the laser mode in the laser ridge 62. For instance, each of the sub-layers 72 in an alignment layer 96 can have a different chemical composition from the one or more immediately neighboring sub-layers 72 and/or each of the sub-layers 72 can have a different chemical composition. For instance, the sub-layers 72 can include or consist of a dopant in the gain medium 70. Each sub-layers 72 can have a different dopant and/or dopant concentration from the one or more neighboring sub-layers 72 and/or each of the sub-layers 72 can have a different dopant and/or dopant concentration. As an example, each sub-layer 72 can includes or consists of two or more components selected from a group consisting of In, P, Ga, and As and different sub-layers 72 can have the elements present in different ratios. In another example, each sub-layer 72 includes or consists In, P and none, one, or two components selected from a group consisting of Ga, and As and each of the different sub-layers 72 has these components in a different ratio. Examples of materials that include multiple elements selected from the above group include different compositions of InP with or without dopants such as In(x)P(1-x) or In—Ga—As—P. Additionally, there may be other sub-layers 72 present to compensate for stress due to lattice mismatch between the compositions of the different sub-layers 72. The location of the laser mode in the laser ridge 62 is defined by the different sub-layers 72 as a result of the refractive indices of the different compositions.

Although FIG. 10A through FIG. 10D illustrate a secondary stop 94 extending upward from a bottom of the alignment trench 92 such that walls of the secondary stop 94 are spaced apart from walls of the alignment trench 92, the bottom of the alignment trench 92 can be substantially flat and one or more alignment layers 96 on the bottom of the alignment trench 92 can serve as the secondary stop 94. However, an embodiment having walls of the secondary stop 94 spaced apart from walls of the alignment trench 92 may be preferred to reduce etch induced inconsistencies on the tops of the secondary stops 94.

One or more secondary alignment recesses 98 can extend into the gain medium 70.

An electrically conducting medium 100 can be positioned under the gain medium 70. The electrically conducting medium 100 can be used as a ground for the laser 60 when applying electrical energy to a laser 60.

Figure 11A:
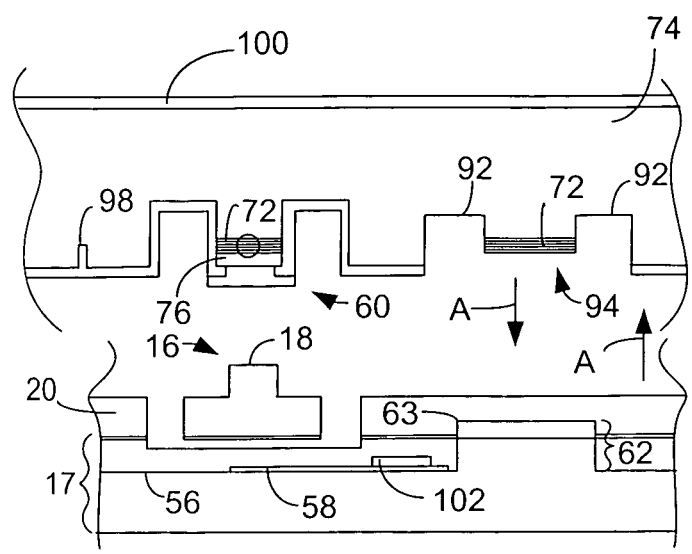
FIG. 11A through FIG. 11C illustrate assembly of the optical system using an optical device constructed according to FIG. 9 and a laser constructed according to FIG. 10A through FIG. 10D. The optical device illustrated in FIG. 11A does not show either a cross-sectional view or a sideview. Instead, the view of the optical device shows the relative positions of different features of the optical device when looking at a sideview of the optical device. In contrast, the laser illustrated in FIG. 11A is a cross-sectional view of the laser such as the cross section of FIG. 10C.

FIG. 11A illustrates assembly of the optical system using an optical device constructed according to FIG. 9 and a laser 60 constructed according to FIG. 10A through FIG. 10D. The optical device illustrated in FIG. 11A does not show either a cross-sectional view or a sideview. Instead, the view of the optical device 10 shows the relative positions of different features of the optical device when looking at a sideview of the optical device. In contrast, the laser 60 illustrated in FIG. 11A is a cross-sectional view of the laser 60 such as the cross section of FIG. 10C.

The optical system can be assembled by moving the optical device and the laser 60 toward one another as indicated by the arrows labeled A. The alignment recesses 98 and the secondary alignment recesses 98 are positioned such that they can be aligned with one another during assembly of the optical system. The alignment of these features achieves horizontal alignment of the laser 60 and the optical device. For instance, alignment of these features achieves horizontal alignment of the waveguide facets 30 with the laser facets. Additionally, each of the stops 62 on the optical device is aligned with one of the secondary stops 94 on the laser 60.

FIG. 11A shows a solder pad 102 positioned on the contact pad 58 on the laser platform 56. The solder pad 102 can be used to immobilize the laser 60 relative to the optical device once the laser 60 is positioned on the optical device. The solder pad 102 can also provide electrical communication between the contact pad 58 on the laser platform 56 and the contact pad 90 on the laser 60.

Figure 11B:
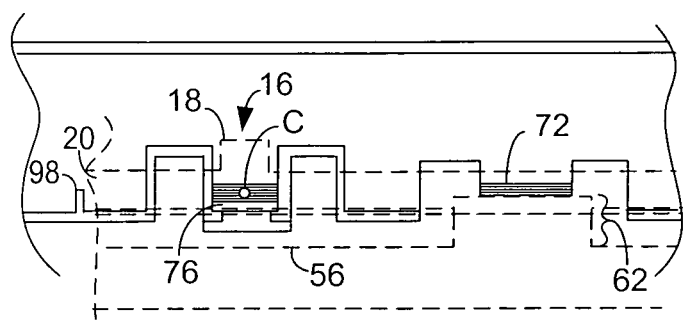
Figure 11C:
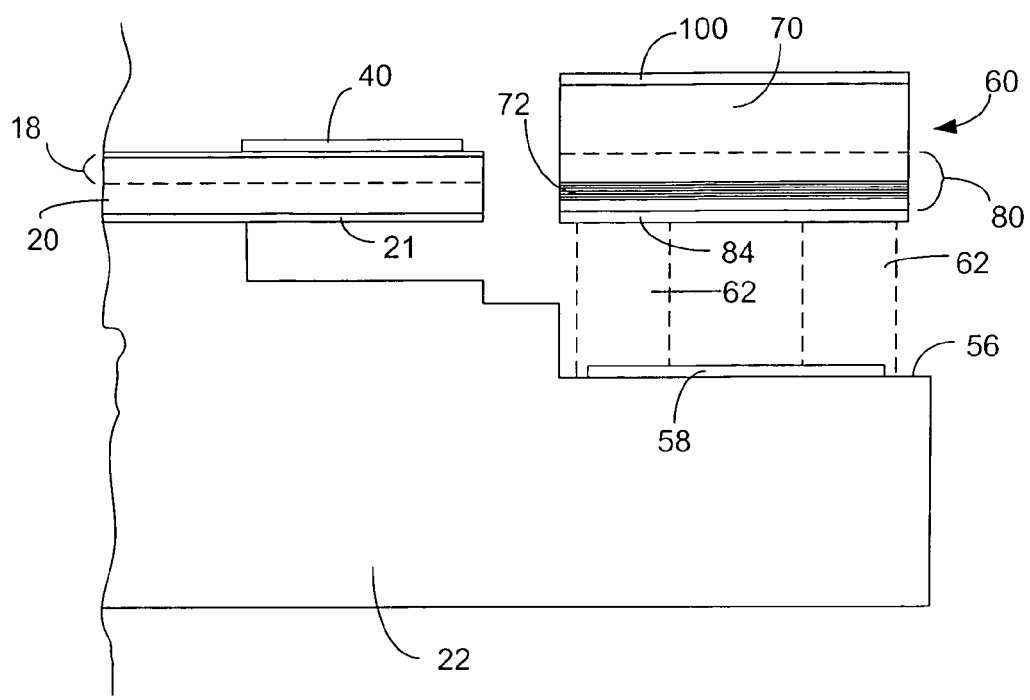

FIG. 11B and FIG. 11C illustrate the optical device of FIG. 11A and the laser 60 of FIG. 11A assembled into an optical system. For the purposes of clarity, in FIG. 11B, the optical device of FIG. 11A is shown by the dashed lines while the laser 60 of FIG. 11A is shown by solid lines. FIG. 11C is a cross section of the system shown in FIG. 11B taken along the longitudinal axis of the waveguide. The solder pads 102 are also removed from FIG. 11B. The dashed lines in FIG. 11C illustrate the location of the stops 62 behind the features that are evident in the cross section.

As is evident in FIG. 11B, each of the stops 62 on the optical device meets one of the secondary stops 94 on the laser 60. As a result, the vertical movement of the optical device and the laser 60 toward one another is limited by the stops 62 butting against the secondary stops 94. Accordingly, the height of the laser mode relative to the waveguides is a function of the thickness of the alignment layer 96. For instance, increasing the thickness of the alignment layer 96 can elevate the laser mode relative to the waveguide. As a result, the alignment layer 96 is formed to place the laser mode in vertical alignment with the waveguide facet 30. For instance, the circles labeled C in FIG. 11B can illustrate the laser mode and also the desired location for the light signal relative to the waveguide. Since the laser mode and the desired location of the light signal to enter waveguide overlap, the thickness of the alignment layer 96 is such that the desired alignment of the laser mode and the waveguide is achieved.

An optical device constructed according to FIG. 9 can include a horizontal actuator and/or a vertical actuator. For instance, FIG. 9 illustrates a resistive heating element 40 positioned on the alignment portion 34 of the waveguide 16 and serving as a vertical actuator. FIG. 9 also illustrates a first electrode 50 and a second electrode 52 serving as a horizontal actuator. After the assembly of the system, the vertical actuator and/or the horizontal actuator can be employed as described above in order to provide additional alignment between the waveguide facet 30 and the laser facet.

Figure 12A:
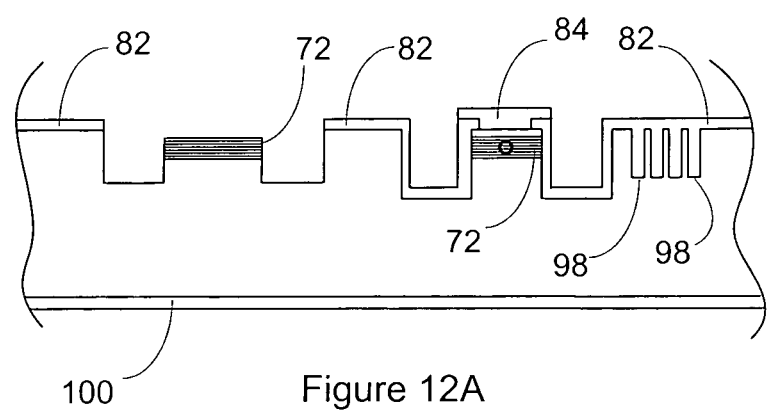
FIG. 12A through FIG. 12B illustrate method of controlling the height of an alignment layer relative to the laser mode of a laser constructed according to FIG. 10A through FIG. 10C.
Figure 12B:
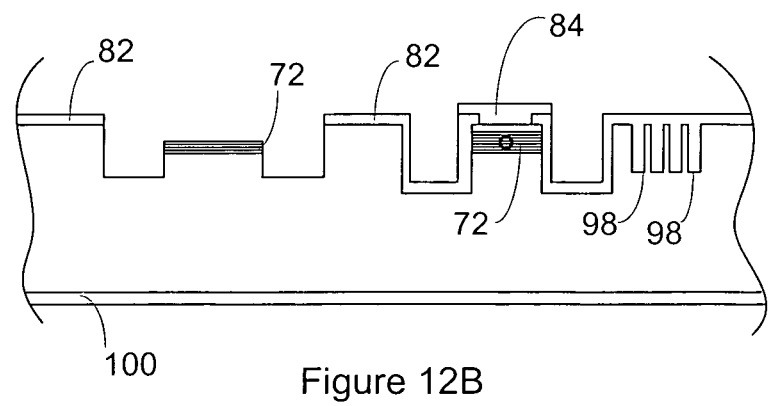

As disclosed above in the context of FIG. 9 through FIG. 11C, the thickness of the alignment layer 96 can affect the vertical alignment of the waveguide facet 30 relative to the laser facet. For instance, vertical alignment can be achieved by achieving a particular height of laser mode relative to the waveguides and since the height of the laser mode relative to the waveguides is a function of the thickness of the alignment layer 96, a method is presented for controlling the thickness of the alignment layer 96. For instance, FIG. 12A through FIG. 12B illustrate method of controlling the height of the alignment layer 96 relative to the laser mode. FIG. 12A is a cross-section of a laser 60 such as the cross-section of FIG. 10C and is taken before the formation of the secondary stop 94 is completed. Because the formation of the secondary stop 94 is not completed, the secondary stop 94 includes more sub-layers 72 than are illustrated in FIG. 10C. As evident in FIG. 10C, each of the sub-layers 72 can be included in the secondary stop 94. Each of the sub-layers 72 in the alignment layer 96 of FIG. 11A corresponds to a sub-layer 72 in the laser ridge 62. For instance, each of the sub-layers 72 in the alignment layer 96 of FIG. 12A can have the same chemical composition of one of the sub-layers 72 in the laser ridge 62. Additionally or alternately, each of the sub-layers 72 in the alignment layer 96 of FIG. 12A can be at the same height as the corresponding sub-layers 72 in the laser ridge 62 and/or have the same thickness as the corresponding sub-layers 72 in the laser ridge 62.

Since the sub-layers 72 in the secondary stop 94 each corresponds to a sub-layer 72 in the laser ridge 62 and the sub-layers 72 in the laser ridge 62 define the position of the laser mode in the laser ridge 62, the location of each sub-layer 72 in the secondary stop 94 relative to the laser mode is known.

Each of the sub-layers 72 in the laser ridge 62 can have different chemical composition from the one or more immediately neighboring sub-layers 72 in the laser ridge 62 and/or each of the sub-layers 72 in the laser ridge 62 can have a different chemical composition. For instance, the sub-layers 72 can include or consist of a dopant in the gain medium 70. Each sub-layers 72 can have a different dopant and/or dopant concentration from the one or more neighboring sub-layers 72 and/or each of the sub-layers 72 can have a different dopant and/or dopant concentration. As an example, each sub-layer 72 can includes or consists of two or more components selected from a group consisting of In, P, Ga, and As and different sub-layers 72 can have the elements present in different ratios. In another example, each sub-layer 72 includes or consists In, P and none, one, or two components selected from a group consisting of Ga, and As and each of the different sub-layers 72 has these components in a different ratio. Examples of materials that include multiple elements selected from the above group include different compositions of InP with or without dopants such as In(x)P(1-x) or In—Ga—As—P. Additionally, there may be other sub-layers 72 present to compensate for stress due to lattice mismatch between the compositions of the different sub-layers 72. The location of the laser mode in the laser ridge 62 is defined by the different sub-layers 72 as a result of the refractive indices of the different compositions.

The different compositions of the sub-layers 72 in the unfinished secondary stop 94 of FIG. 11A can be employed to control the thickness of the alignment layer 96. For instance, one or more sub-layers 72 can be removed from the unfinished secondary stop 94 until the alignment layer 96 has the desired thickness. As an example, the top two layers of the unfinished secondary stop 94 of FIG. 11A are removed in order to provide the secondary stop 94 illustrated in FIG. 12B. The one or more sub-layers 72 can be removed by etching. The etch can be chosen such that the sub-layer 72 that will serve as the uppermost sub-layer 72 of the completed alignment layer 96 acts as an etch stop. As a result, the thickness of the alignment layer 96 can be controlled by selecting the sub-layer 72 that will serve as the etch stop and then selecting the appropriate etch. Further, since the height of each sub-layer 72 relative to the laser mode is fixed, the ability to control the thickness of the alignment layer 96 also allows the height of the alignment layer 96 relative to the laser mode to be both known and controlled.

In some instances, before any of the sub-layers 72 are removed from the alignment layer 96, the alignment layer 96 can have more than 3 sub-layers 72, more than 5 sub-layers 72, more than 7 sub-layers 72, or more than 9 sub-layers 72. Accordingly, the laser ridge 62 can have more than 3 sub-layers 72, more than 5 sub-layers 72, more than 7 sub-layers 72, or more than 9 sub-layers 72.

Although FIG. 11A and FIG. 11B illustrate components such as the laser cladding 82 and first electrical conductor 84 in place on the laser 60 at the time the sub-layers 72 are removed from the unfinished secondary stop 94, the sub-layers 72 can be removed from the secondary stop 94 before any, all, or a portion of these components are formed on the laser 60.

An optical device according to FIG. 9 can be fabricated by etching the ridge for the waveguide. The gap between the alignment portion of the waveguide and the base can then be formed as disclosed in U.S. patent application Ser. No. 08/643,476, filed on May 6, 1996, entitled "Connection Between an Integrated Optical Waveguide and an Optical Fiber," granted U.S. Pat. No. 5,787,214, and incorporated herein in its entirety. The secondary platform 66 and the base portion 64 of the stops 62 can be etched by etching through the first light transmitting medium using an etch for which the light insulator 21 acts as an etch stop followed by etching through the light insulator 21 using an etch for which the substrate 28 acts as an etch stop. The alignment marks 68 can be etched into the first light-transmitting medium 20 and the cladding 63 can be deposited on the first light-transmitting medium 20 and on the base portion 64 of the stops 62. Additional components such as the contact pads and other electrical components can then be formed on the optical device. An additional etch can be used to form the secondary platform 66 below the level of the light insulator 21 (i.e. etch into the substrate 28) but without etching the base portion 64 of the stops 62.

The laser 60 can be generated by purchase from a supplier and/or fabricated using traditional techniques. The system can be assembled by placing the laser 60 on the optical device. In an optical device constructed according to FIG. 9, the height of the stops 62 can be determined from the fabrication process or can be measured. The height of the stops 62 can be combined with the desired height of the laser mode to determine the alignment layer 96 thickness needed to achieve the desired vertical alignment. The sub-layer 72 that would serve as the upper-most sub-layer 72 in an alignment layer 96 having the desired thickness can then be identified. An etch or serial combination of etches that would expose the identified sub-layer 72 without detrimentally etching the identified sub-layer 72 can also be identified. The identified etches can then be performed so as to remove one or more sub-layers 72 above the identified sub-layer 72 and expose the identified sub-layer 72. The laser 60 can then be positioned on the optical device with the stops 62 extending into the alignment trenches 92 and contacting (or butting against) the secondary stops 94 as evident in FIG. 11B.

The above discussions disclose using a first material as an etch stop against an etch configured to etch a second material in contact with the first material. A first material acts as an etch stop when the etch is significantly more corrosive (often called more selective) of the second material than of the first material. As a result, once the etch etches through the second material to the first material, the etch rate drops. Because the etch rate drops, the importance of the etch duration drops and the etch can be executed for a period of time that ensures that the second material will be etched without significantly etching into the first material.

Although the laser 60 is disclosed as having a single laser 60, a plurality of lasers can be included on a single laser bar as disclosed in U.S. patent application Ser. No. 12/215,693, filed on Jun. 28, 2008, entitled "Interface Between Light Source and Optical Component," and incorporated herein in its entirety. Further, the Optical Device can include multiple waveguide that each ends at a waveguide facet 30 to be aligned with one of the lasers on the laser bar. Each of these waveguide facets 30 can be associated with one or more vertical actuators and/or one or more horizontal actuators. The one or more vertical actuators and/or one or more horizontal actuators associated with a waveguide facet 30 can be employed to move that waveguide facet 30 relative to one of the laser facets.

Additionally, although the laser 60 can have a bar structure, the laser 60 need not have a bar shape. For instance, the laser 60 can be a one piece device having a laser 60 array or a structure that includes lasers 60 that are immobilized relative to one another before being positioned on the optical device.

Additional details about the construction, operation and fabrication of the optical device and laser illustrated in FIG. 9 through FIG. 12B can be found in U.S. patent application Ser. No. 12/215,693, filed on Jun. 28, 2008, entitled "Interface Between Light Source and Optical Component," and incorporated herein in its entirety.

The system disclosed in the context of FIG. 9 through FIG. 12B discloses a variety of alignment mechanisms in addition to the device including one or more vertical actuators and/or one or more horizontal actuators. Because the optical device includes the one or more vertical actuators and/or one or more horizontal actuators, all or a portion of these alignment mechanisms can be optional. For instance, the alignment recesses 98, the secondary alignment recesses 98, and/or the use of the alignment layer 96 can be optional.

As noted above, control electronics 46 can control the operation of the one or more actuators. Suitable device control electronics 46 include, but are not limited to, firmware, hardware and software or a combination thereof. Examples of suitable control electronics 46 include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the control electronics 46 includes a memory that includes instructions to be executed by a processing unit during performance of the control and monitoring functions.

The electronics 46 can use feedback control to adjust the alignment of the waveguide facet 30 and the second facet 36 during the operation of the system. For instance, after the second optical device is mounted on the first optical device with the second facet 36 positioned to exchange light signals with the waveguide facet 30, the electronics 46 can be configured to measure the level of optical loss in the system and then adjust the one or more actuators so as to reduce the level of optical loss. Once the appropriate desired level of alignment has been achieved, the electronics 46 can be operated so as to retain this alignment or can be configured to dynamically adjust the alignment during the operation of the system.

Although the system is shown with a single waveguide facet 30 aligned with a single second optical device, the system can include more than one waveguide facet 30 that are each optically aligned with a second facet 36. More than one of the second facets 36 can be on the same second optical device or each of the second facets 36 can be on a different second optical device.

Although the actuators described above employ electrostatics or differentials in the coefficient of expansion to achieve actuation, other techniques can be employed to achieve actuation. For instance, the system can employ piezoelectrics in order the achieve the desired actuation.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical system, comprising:
a semiconductor laser having a gain medium that terminates at a second facet;
an optical device having a waveguide on a base,
the waveguide guiding light signals through a light-transmitting medium that terminates at a waveguide facet, the light-transmitting medium being different from the gain medium,
the waveguide facet optically aligned with the second facet such that an optical pathway that light signals travel between the second facet and the waveguide facet does not pass through a second waveguide; and
the optical device having one or more actuators that are each configured to move the waveguide facet relative to the second facet such that a location where a line is incident on the second facet changes upon use of the actuator, the line being a line through the waveguide facet and parallel to the direction of propagation of light signals in the waveguide at a location that is both at the waveguide facet and on the waveguide side of the waveguide facet.

2. The system of claim 1, wherein at least one of the one or more actuators is configured to change a distance between the waveguide facet and a reference plane,
the reference plane including a non-actuated line, being perpendicular to the top of the waveguide, and extending through the base,
the non-actuated line being parallel to a direction of propagation of light signals in the waveguide at a location that is both at the waveguide facet and on the waveguide side of the waveguide facet at a time when the waveguide facet is in a rest position,
the rest position being a position of the waveguide facet when none of the one or more actuators is affecting a location of the waveguide facet.

3. The system of claim 1, wherein at least one of the one or more actuators is configured to move the waveguide facet without changing a distance between the waveguide facet and a reference plane,
the reference plane including a non-actuated line, being perpendicular to the top of the waveguide, and extending through the base,
the non-actuated line being parallel to a direction of propagation of light signals in the waveguide at a location that is both at the waveguide facet and on the waveguide side of the waveguide facet at a time when the waveguide facet is in a rest position,
the rest position being a position of the waveguide facet when none of the one or more actuators is affecting a location of the waveguide facet.

4. The system of claim 1, wherein at least one of the one or more actuators includes a resistive heater.

5. The system of claim 1, wherein at least one of the one or more actuators employs an electrostatic force to move a first electrode relative to a second electrode.

6. An optical system, comprising:
an optical device having a waveguide on a base,
the waveguide terminating at a waveguide facet,
the waveguide having a top and a bottom, the bottom being between the top of the waveguide and the base; and
a waveguide actuator configured to move the waveguide facet so as to change a distance between the waveguide facet and a reference plane,
the reference plane including a non-actuated line, being perpendicular to the top of the waveguide, and extending through the base,
the non-actuated line being parallel to a direction of propagation of light signals in the waveguide at a location that is both at the waveguide facet and on the waveguide side of the waveguide facet at a time when the waveguide facet is in a rest position,
the rest position being a position of the waveguide facet when the actuator is not affecting a location of the waveguide facet; l and
a second waveguide actuator configured to move the waveguide without changing the distance between the waveguide facet and the reference plane.

7. The system of claim 6, wherein the second waveguide actuator includes a heater positioned on an alignment portion of the waveguide, the alignment portion of the waveguide being a portion of the waveguide that includes the waveguide facet and is also movable relative to the base.

8. The system of claim 6, wherein the waveguide actuator includes a first electrode and a second electrode,
the first electrode being positioned on a first portion of the optical device that is configured to move relative to the base,
the first portion of the optical device including the waveguide facet,
the second electrode being positioned on a second portion of the optical device that is immobilized relative to the base,
the proximity between the first electrode and the second electrode being such that generation of an electrostatic force between the first electrode and the second electrode causes movement of the first electrode relative to the second electrode.

9. The system of claim 8, further comprising:
electronics configured to generate an electrostatic force between the first electrode and the second electrode.

10. The system of claim 6, further comprising:
a second optical device having a second facet, the second optical device configured such that the second facet is positioned so as to exchange light signals with the waveguide facet.

11. The system of claim 10, wherein the second optical device is an optical fiber.

12. An optical system, comprising:
an optical fiber having a second facet;
an optical device having a waveguide on a base,
the waveguide terminating at a waveguide facet,
the waveguide facet being optically aligned with the second facet such that an optical pathway that light signals travel between the second facet and the waveguide facet does not pass through a second waveguide; and
the optical device having one or more actuators that are each configured to move the waveguide facet relative to the second facet such that a degree of optical alignment between the waveguide facet and the second facet changes in response to the movement of the waveguide facet by the one or more actuators.

13. The system of claim 12, wherein at least one of the one or more actuators is configured to change a distance between the waveguide facet and a reference plane, the reference plane including a non-actuated line, being perpendicular to the top of the waveguide, and extending through the base, the non-actuated line being parallel to a direction of propagation of light signals in the waveguide at a location that is both at the waveguide facet and on the waveguide side of the waveguide facet at a time when the waveguide facet is in a rest position, the rest position being a position of the waveguide facet when none of the one or more actuators is affecting a location of the waveguide facet.

14. The system of claim 12, wherein at least one of the one or more actuators is configured to move the waveguide facet without changing distance between the waveguide facet and a reference plane, the reference plane including a non-actuated line, being perpendicular to the top of the waveguide, and extending through the base, the non-actuated line being parallel to a direction of propagation of light signals in the waveguide at a location that is both at the waveguide facet and on the waveguide side of the waveguide facet at a time when the waveguide facet is in a rest position, the rest position being a position of the waveguide facet when none of the one or more actuators is affecting a location of the waveguide facet.

15. The system of claim 12, wherein at least one of the one or more actuators includes a resistive heater.

16. The system of claim 12, wherein at least one of the one or more actuators employs an electrostatic force to move a first electrode relative to a second electrode.

17. A method of operating an optical system, comprising:
providing an optical device having a waveguide on a base,
the waveguide terminating at a waveguide facet,
the waveguide having a top and a bottom, the bottom being between the top of the waveguide and the base; and employing a waveguide actuator included on the optical device to move the waveguide facet so as to change a distance between the waveguide facet and a reference plane, the reference plane including a non-actuated line, being perpendicular to the top of the waveguide, and extending through the base, the non-actuated line being parallel to a direction of propagation of light signals in the waveguide at a location that is both at the waveguide facet and on the waveguide side of the waveguide facet at a time when the waveguide facet is in a rest position, the rest position being a position of the waveguide facet when the actuator is not affecting a location of the waveguide facet, employing a second waveguide actuator included on the optical device to move the waveguide facet without changing a distance between the waveguide facet and the reference plane.

18. A method of operating an optical system, comprising:
providing an optical fiber and an optical device,
the optical fiber having a second facet,
the optical device having a waveguide on a base,
the waveguide terminating at a waveguide facet,
the waveguide facet being optically aligned with the second facet such that an optical pathway that light signals travel between the second facet and the waveguide facet does not pass through a second waveguide;

employing one or more actuators included on the optical device to move the waveguide facet relative to the second facet.

19. The system of claim 1, wherein the light signals are transmitted through the second facet, and
the waveguide facet receives the light signals after the light signals are transmitted through the second facet.

20. The system of claim 1, wherein a gas is positioned between the waveguide facet and the second facet.

* * * * *